(12) United States Patent
Oda

(10) Patent No.: US 6,546,121 B1
(45) Date of Patent: Apr. 8, 2003

(54) METHOD AND APPARATUS FOR IDENTIFYING AN IRIS

(75) Inventor: Takahiro Oda, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/263,765

(22) Filed: Mar. 5, 1999

(30) Foreign Application Priority Data

Mar. 5, 1998 (JP) .......................................... 10-071419

(51) Int. Cl.[7] .................................................. G06K 9/00
(52) U.S. Cl. ........................ 382/117; 382/181; 382/232
(58) Field of Search ................................. 382/117, 115, 382/162, 181, 190, 195, 199, 203, 222, 232; 351/205, 206

(56) References Cited

U.S. PATENT DOCUMENTS

| | | | | |
|---|---|---|---|---|
| 4,641,349 A | | 2/1987 | Flom et al. .................. 382/117 |
| 5,128,711 A | * | 7/1992 | Terashita et al. ............ 358/527 |
| 5,291,560 A | * | 3/1994 | Daugman ................... 382/117 |
| 5,293,427 A | * | 3/1994 | Ueno et al. .................. 382/173 |
| 5,428,421 A | * | 6/1995 | Kawahara et al. .......... 348/363 |
| 5,430,809 A | * | 7/1995 | Tomitaka .................... 382/173 |
| 5,497,196 A | * | 3/1996 | Nishida ....................... 348/363 |
| 5,572,596 A | | 11/1996 | Wildes et al. ............... 382/117 |
| 5,719,951 A | * | 2/1998 | Shackleton et al. ......... 382/118 |
| 5,745,174 A | * | 4/1998 | Nakano .................. 348/333.03 |
| 5,818,954 A | * | 10/1998 | Tomono et al. ............. 382/115 |
| 5,859,921 A | * | 1/1999 | Suzuki ........................ 382/118 |
| 6,072,893 A | * | 6/2000 | Luo et al. ................... 382/291 |
| 6,151,403 A | * | 11/2000 | Luo ............................ 382/117 |

* cited by examiner

*Primary Examiner*—Bhavesh Mehta
*Assistant Examiner*—Sheela Chawan
(74) *Attorney, Agent, or Firm*—Venable LLP; Michael A. Sartori

(57) ABSTRACT

The present invention is a method and an apparatus for identifying an iris that can compare new identification code with registered identification code regardless of the slant of the face of a person to be identified because the identification code produced using a standard line does not influence the slant of the face of the person. The apparatus provides a photographing part, a standard line deriving part, an iris extracting part, a code producing part, a code registering part, and a comparison part. The photographing part photographs an area including both eyes. The standard line deriving part calculates a standard line passing through the center of both eyes. The iris extracting part extracts an iris area on the standard line by luminance distribution. The code producing part divides the iris area into a plurality of pieces, calculates a luminance for each piece and codes the luminance distribution of the pieces on the basis of the standard line. The comparison part compares the identification code produced by the code producing part with the identification code registered by the code registering part.

13 Claims, 14 Drawing Sheets

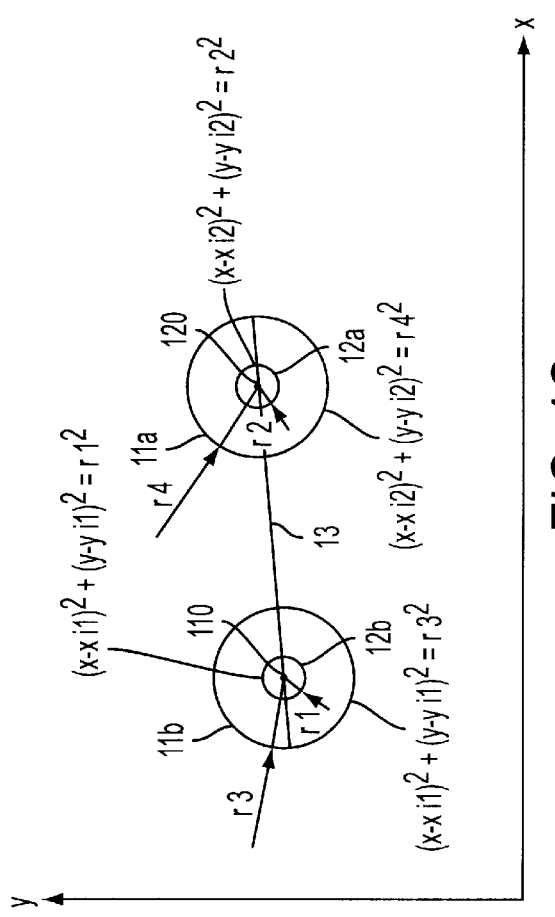
FIG. 4C
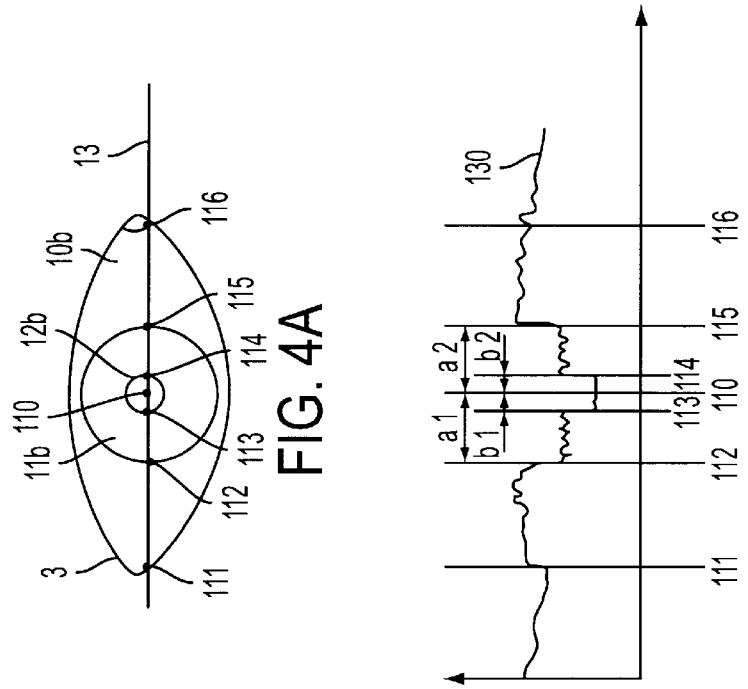
FIG. 4A
FIG. 4B

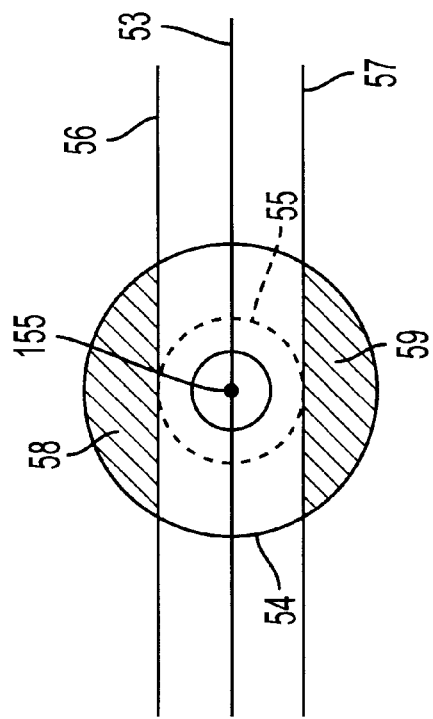
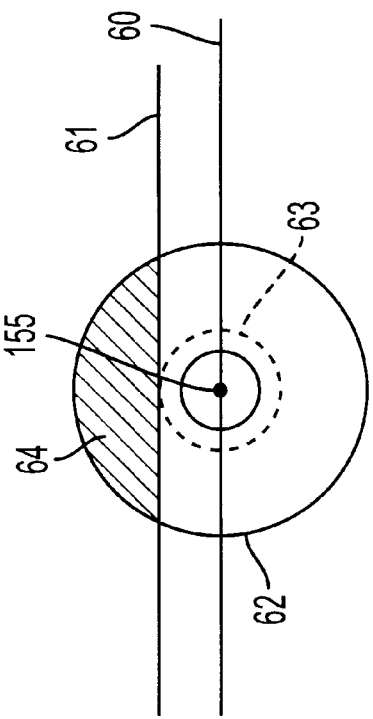

METHOD AND APPARATUS FOR IDENTIFYING AN IRIS

BACKGROUND OF THE INVENTION

1. Field of the Invention

This invention relates to an iris identification method and apparatus for identifying an individual by using the iris of human or animals, and a data converter for coding data by using an iris data.

2. Description of the Related Art

There is known an iris identification apparatus for identifying an individual by using an iris of a human. The apparatus gets an image data of iris, produces iris codes from the image data, comparing the produced iris code with registered iris code and identifies the individual.

The apparatus takes photography of an eye with a camera and gets an iris image data. The iris image data is converted into an identification code by predetermined image processing, and the identification code is registered at the apparatus. In the case that an individual recognition is executed, the apparatus acquires an iris image data of the eye through the camera and generate an identification code from the iris image data. The identification code is compared with the registered code in advance. If the identification code agrees with the registered code, the result that the individual recognition completes normality is informed.

The camera provides a lens for taking a photograph of human eye as large as possible. The person's eye is photographed with the camera while a person to be identified changes a posture so that the person's eye is placed on an optical axial of the lens.

However, the person has to change briskly the posture until the person's eye meet the optical axial. Therefore, it is a lot of trouble for the person to be identified.

Furthermore, after the original iris data taken with prescribed posture is registered, it is very difficult to make the same posture in order to acquire an iris data for identifying again. Thus, it is possible that the iris data for identifying disagrees with the original iris data.

However, a problem encountered with the prior art apparatus is that a stable iris data is not taken when a head or face of an identified person is tilting.

SUMMARY OF THE INVENTION

Accordingly, it is an object of the present invention to provide an iris identification method and apparatus, which can be obtained a stable iris data even though a head or face of an identified person is tilting.

Another object of the invention is to provide an iris identification method and apparatus, which can identify an iris data accurately even if it can not take photography of a whole iris because an eyelid closes the iris.

Still another object is to provide a data converter for encoding data by using an identification data produced by an iris as a key.

The present invention is an iris identification apparatus for a photographing part for photographing an area including both eyes, a standard line deriving part for calculating a standard line passing through the center of both eyes, an iris extracting part for extracting an iris area on the standard line by luminance distribution, a code producing part for dividing the iris area into a plurality of a piece, calculating a luminance in the plurality of the piece and coding the luminance distribution of the plurality of the piece on the basis of the standard line, a code registering part for registering the identification code, and a comparison part for comparing the identification code produced by the code producing part with the identification code registered by the code registering part.

In another embodiment of the invention, An apparatus for changing data is provided a photographing part for photographing an area including both eyes, a standard line deriving part for calculating a standard line passing through the center of both eyes, an iris extracting part for extracting an iris area on the standard line by luminance distribution, a code producing part for dividing the iris area into a plurality of a piece, calculating a luminance in the plurality of the piece and coding the luminance distribution of the plurality of the piece on the basis of the standard line, and a changing part for changing the data by using the code coded by the code producing part in accordance with the predetermined function.

BRIEF DESCRIPTION OF THE DRAWINGS

The present invention is illustrated in the drawings in which:

FIGS. 3A, 3B, 3C, 4A, 4B, 4C, 5A, 5B, 5C, 5D and 5E illustrate a process for processing an image in the apparatus shown in FIG. 1;

FIGS. 12A and 12B show a process for producing crimination code in the third embodiment;

DETAILED DESCRIPTION OF THE PREFERRED EMBODIMENTS

Figure 1:
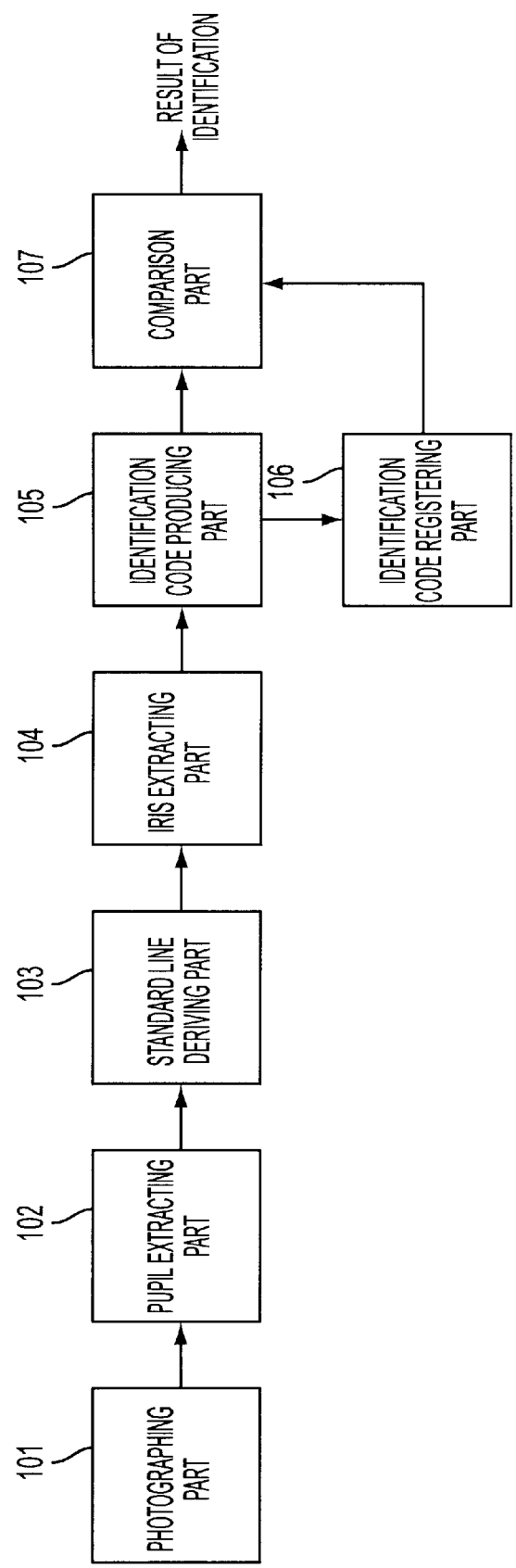
FIG. 1 is a basic block diagram of an iris identification apparatus of the present invention.

Referring to FIG. 1, there is shown an iris identification apparatus having a photographing part 101, a pupil extracting part 102, a standard line deriving part 103, an iris extracting part 104, a identification code producing part 105, an identification code registering part 106 and a comparison part 107. The photographing part 101 gets an image data of both eyes of human once. The pupil extracting part 102 extracts pupil areas of both eyes from the image data. The standard line deriving part 103 calculates central points of the pupil areas of both eyes extracted by the pupil extracting part 102, and then calculates a standard line passing the central points.

The iris extracting part 104 measures luminance of the white of the eye, the iris and the pupil on the standard straight line. Furthermore, the iris area extraction part calculates a distance to the edge of the iris and the pupil from the center of the pupil, and calculates the iris area.

The identification code producing part 105 produces identification code by analyzing the luminance distribution of an iris pattern. The identification code registering part 106 registers the identification code produced by the identification code producing part 105 in a storage device (not shown).

The comparison part 107 compares identification code for identifying with the identification code registered in the storage device (not shown), and identifies a person.

Further, the above elements 102, 103, 104, 105, 106 and 107 are executed by a computer consisted of a processor, a main storage device and external storage devices.

Figure 2:
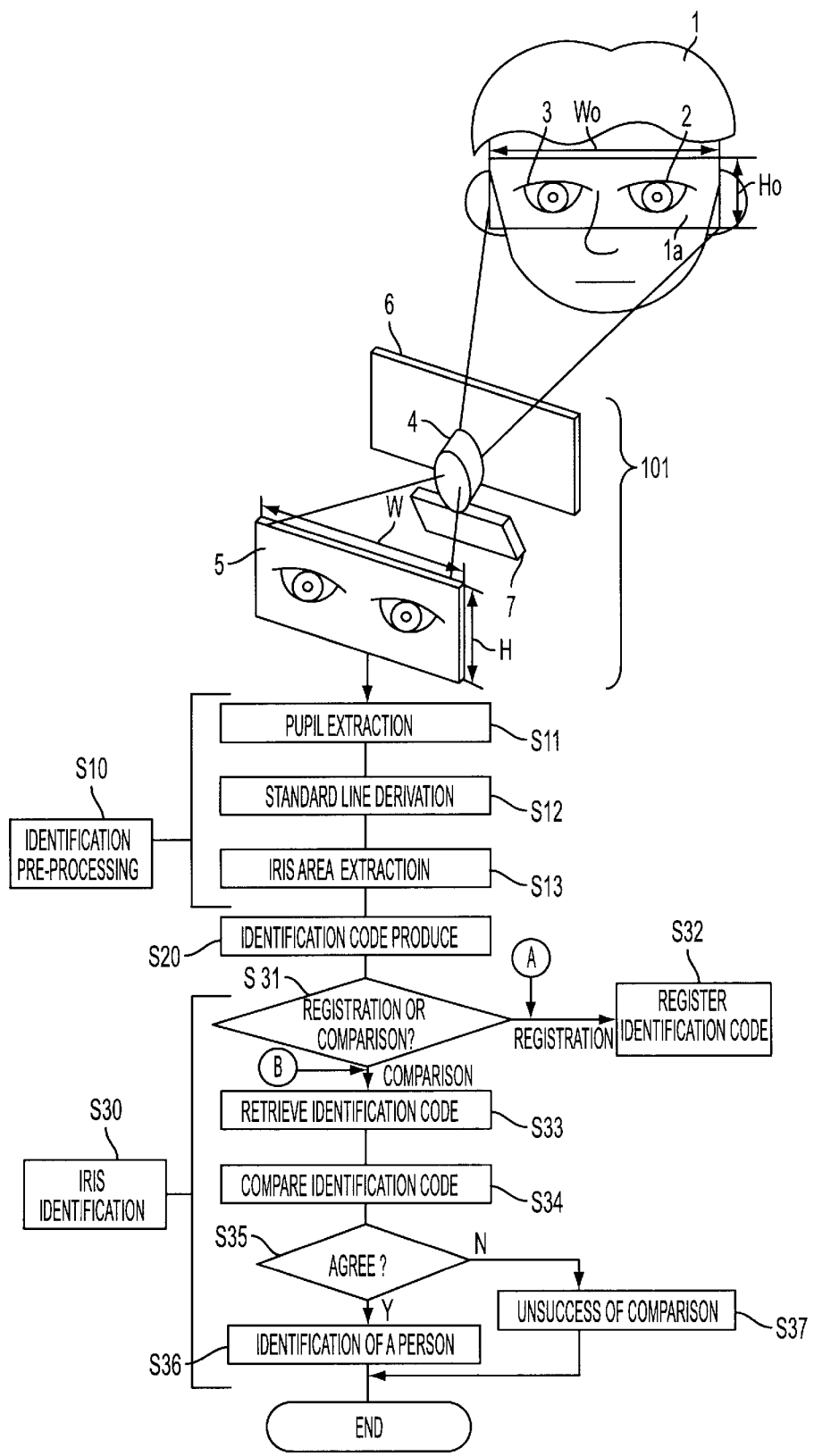
FIG. 2 is a flow diagram, which shows an operation of the apparatus shown in FIG. 1.

Referring to FIG. 2, there is explained about the workings of the photographing part 101. The photographing part 101 consists of a camera lens 4, an image device 5, a visible light cutting glass 6 and a lighting unit 7.

The visible light cutting glass 6 is put on the closest position from a person 1 to be identified and the image device 5 is put on the farthest position from the person 1. And the camera lens 4 is put between the visible light cutting glass 6 and the image device 5. The lighting unit 7 irradiates the infrared light toward an area 1a including both of the eyes of the person 1.

The photographing part 101 cuts the visible light by the visible light cutting glass 6 from a reflection image of the area 1a illuminated by the lighting unit 7 and passes a reflection image of an infrared area to the camera lens 4 through the glass. Then, the camera lens 4 focuses the reflection image of an infrared area on the image device 5. The photographing part 101 sets up pixels, a size (width W, height H) of the image device 5 and a focal distance of the camera lens 4 so that the individual recognition will be possible.

The distance between the camera lens 4 and the person 1 to be identified is fixed because the distance between the camera lens 4 and the image element 5 is fixed. Therefore, the person 1 has to move in front of and behind his/her head so that the camera lens 4 can focus the image on the image element 5. In present embodiment, the person 1 watches the image reflecting in the visible light cutting glass 6, and confirms the position and size of the image. Thus, the image is focused on the image element 5 and the scope of photography is fixed. For example, a mark is put on the visible light cutting glass 6, and the person 1 moves the position of one's head so that the mark with the pre-determined size is watched.

Next, an image process for processing an image of the area 1a taken by the photographing part 101 is explained.

The process for processing the image consists of identification preprocessing (step S10), identification code produce (step S20) and iris identification (step S30). The identification pre-processing consists of three steps that are a pupil extraction (step S11), a standard line derivation (step S12) and an iris area extraction (step S13). The step S11 is executed in the pupil extracting part 102, the step S12 is executed in the standard line deriving part 103 and the step S13 is executed in the iris extracting part 104.

The iris identification in the step S30 registers new identification code produced by the identification code produce in the step S20 and compares the new identification code with original identification code produced in the past.

Figure 3A:
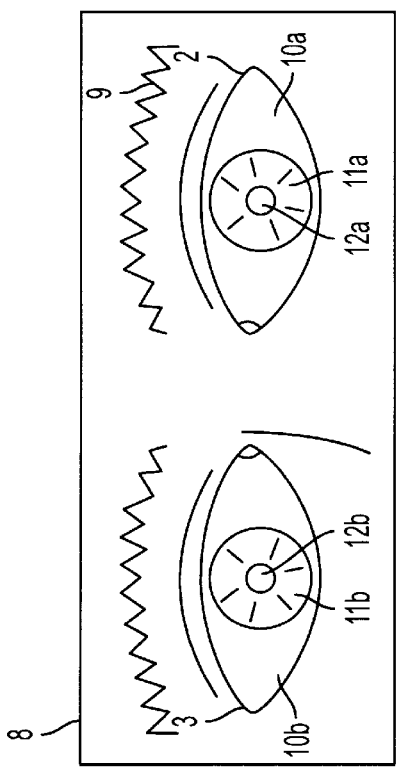
Figure 3B:
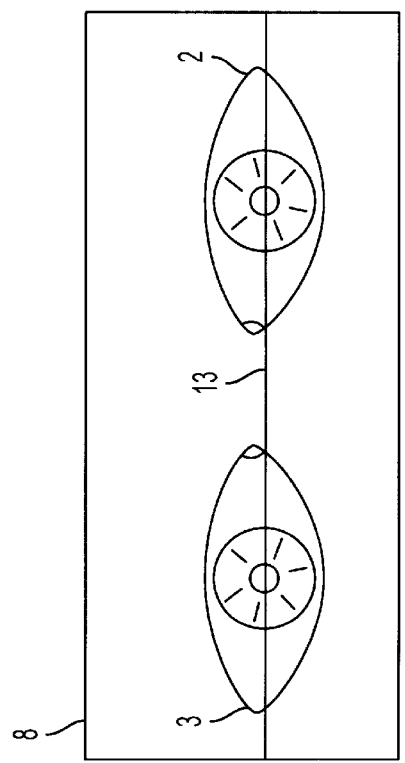

Referring to FIGS. 3, 4 and 5, there are explained an image processing. The image device 5 takes image data shown in FIG. 3A. In FIG. 3A, an eyebrow 9, a white of the left eye 10a, a white of the right eye 10b, an iris of the left eye 11a, an iris of the right eye 11b, a pupil of the left eye 12a and a pupil of the right eye 12b is put on the scope of photography 8.

First of all, there is explained the pupil extraction shown in step S11. It is easy taking a photograph of the whole of the pupil because the pupil usually shapes like a circle when a human sees something. However, it is difficult to distinguish between the iris and the pupil because the Pupil is observed blackly in the dark environment of indoor.

Figure 3C:
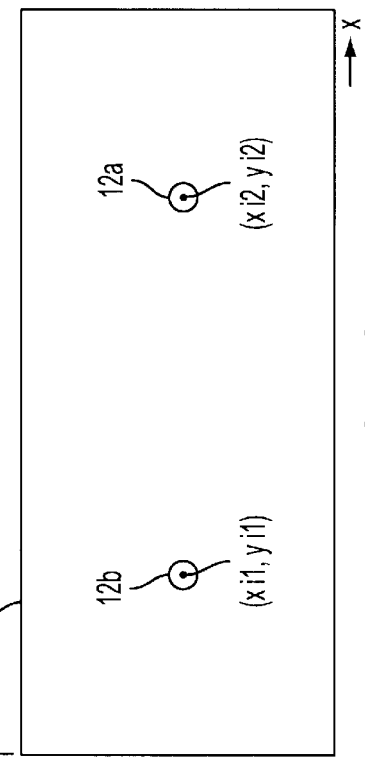

It is for that purpose that the iris can take a photograph brightly than the pupil by using a characteristic of the living body, in which the iris has high reflection strength against infrared light. Therefore, the pupil is extracted by the difference of the luminance between the pupil and the iris. That is, two circles shown in FIG. 3C is extracted from the scope of photography 8 by processing the image on conditions that is set up to be darkest and almost circular.

An area is calculated from pixels including the two circles and center coordinates 110 and 120 of each circle (shown in FIG. 3C) is found.

Next, the process for deriving a standard line 13 (shown in FIG. 3B) that is the line through the center of both the pupils is executed in the step S12. A part crossing the line 13 and the iris is used as a starting pattern and an ending pattern for changing from the iris pattern to the identification code. The white, iris and pupil of the eye are on the line 13. An equation passing both the coordinates 110 and 120 is as follows:

$$(y-yi1)/(yi2-yi1)=(x-xi1)/(xi2-xi1) \tag{1}$$

The iris area extraction is executed in step S13 after the standard line 13 is derived in step S12.

Referring to FIG. 4A, there is shown a result analyzed the right eye of the person 1 to be identified. Coordinates 110, 111, 112, 113, 114, 115 and 116 are crossing the standard line 13 and the living body's characteristics, wherein the living body's characteristics are the white, iris and pupil of the eye. The coordinate 111 is crossing the standard line 13 and a dividing line that is between the white of the right eye 10b and a skin. The coordinates 112 and 115 are crossing the standard line 13 and a dividing line that is between the white of the right eye 10b and the iris 11b. The coordinates 113 and 114 are crossing the standard line 13 and a dividing line that is between the iris 11b and the pupil 12b. The coordinate 116 is crossing the standard line 13 and a dividing line that is between the white of the right eye 10b and a tear.

A characteristic curve 130 shows a luminance distribution of the right of the right eye 3 in the standard line 13 in FIG. 4B. In FIG. 4B, a vertical line is the force of the luminance and a horizontal line is the position of the eye.

The iris 11b is supposed as a circle form that has the same center coordinate 110 as the pupil 12b. A radius of a circle formed by the dividing line between the iris 11b and the pupil 12b is estimated under the smaller distance by comparing a distance b1 that is between the coordinate 110 and the coordinate 113 with a distance b2 that is between the coordinate 110 and the coordinate 114. A radius of a circle formed by the dividing line between the white of the right eye 10b and the iris 11b is estimated under the bigger distance by comparing a distance a1 that is between the coordinate 110 and the coordinate 112 with a distance a2 that is between the coordinate 110 and the coordinate 115. The above operation also is executed in the left eye.

Referring to FIG. 4C, there is shown an iris area that is area encircled by the big circles 11a, 11b and the small circles 12a, 12b. The iris area is a scope for deriving the identification code from the iris pattern. Each pupil radius r1, r2 and each iris radius r3, r4 of both eyes is shown as follows:

$$r1^2 = (x-xi1)^2 + (y-yi1)^2 \qquad (2)$$

$$r3^2 = (x-xi1)^2 + (y-yi1)^2 \qquad (3)$$

$$r2^2 = (x-xi2)^2 + (y-yi2)^2 \qquad (4)$$

$$r4^2 = (x-xi2)^2 + (y-yi2)^2 \qquad (5)$$

The identification code produce (step S20) is executed by the identification code producing part 105. The radius r1, r2 changes by the strength of the visible light. The iris pattern also changes in response to a pupillary reflex of the pupil. In this embodiment, the iris pattern within the iris area is divided into the predetermined numeral belong toward the radius and the circumference of a circle. The luminance of each divided iris pattern is measured. In this way, the luminance distribution of a plural of a ringed area taken by dividing the iris area is found.

Figure 5A:
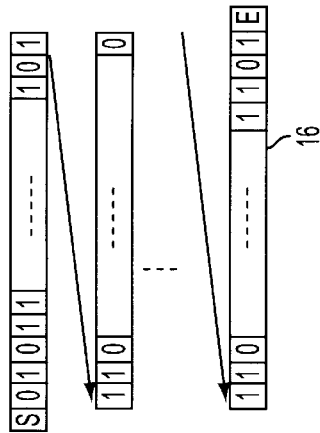

Referring to FIG. 5A, the method for measuring luminance is explained. The identification code producing part 105 makes to agree the iris area defined in FIG. 4B with the arrangement of pixels consisting of the image device 5 and calculates divided number for measuring luminance in the iris area under the arrangement and number of the pixels of the image device 5. The iris pattern measured by luminance of pixel S adjacent to the pupil supposes a starting pattern for coding. The iris pattern measured by luminance of the pixel E adjacent to the white of the eye supposes an ending pattern for coding. Further, both the pixels S, E are put on the standard line 13. The iris area is divided into four ringed areas 11ba, 11bb, 11bc and 11bd toward the radius, and the luminance of each ringed area is measured toward an arrow Z that is a counterclockwise.

Next, each ringed area 11ba, 11bb, 11bc and 11bd is divided toward circumference. All of rectangular areas taken by dividing the ringed areas are equal in length. In FIG. 5A, the ringed area 11ba is divided into the rectangular areas 11bp of twenty-one pieces. Thus, another ringed areas 11bb, 11bc and 11bd are divided so that rectangular areas become as the same length as the rectangular areas divided into twenty-one pieces. That is, the other ringed areas 11bb, 11bc and 11bd consist of the rectangular areas over twenty-one pieces.

Finally, the identification code producing part 105 produces identification code of the iris area by tying the four ringed areas 11ba, 11bb, 11bc and 11bd together. That is, an ending rectangular area formed in the inside ringed area is tied to a starting rectangular area formed in the outside ringed area.

Figure 5B:
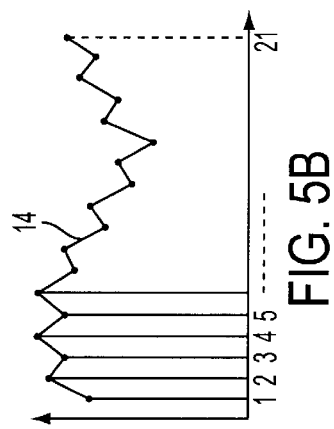
Figure 5C:
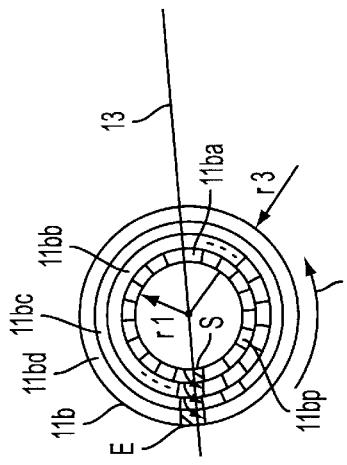

Referring to FIG. 5B, there is shown the result that has measured the luminance value of the rectangular areas of twenty-one pieces in the ringed area 11ba. In FIG. 5B, the vertical line shows a luminance value. And the horizontal axis shows rectangular areas numbered from 1 to 21. Further, change of the luminance value depends on an iris pattern existing the iris area.

The identification code producing part 105 removes a low frequency component included to a characteristic curve 14 by a filter (not shown). As a result, the curve 14 changes a characteristic curve 15 shown in FIG. 5C.

Figure 5D:
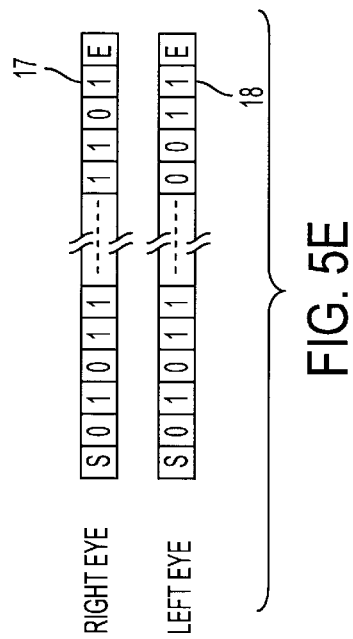

The identification code producing part 105 changes an analog signal in the curve 15 into a digital signal. That is, if luminance value of the curve 15 is a plus sign, a 1 in a binary numeral is expressed as one bit. And if the luminance value is a minus sign, a 0 in a binary numeral is expressed as one bit. Referring to FIG. 5D, there is shown the digital signal changed by the above processing. The digital signal is an identification code of the ringed area 11ba.

Though the above processing is steps for producing the identification code of the ringed area 11ba, the other area 11bb, 11bc and 11bd also is produced by the same process mentioned above. In this embodiment, each identification code produced by the four ringed areas 11ba, 11bb, 11bc and 11bd is combined as one code by tying each identification code together.

Figure 5E:
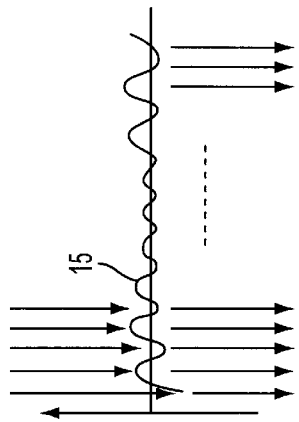

As mentioned above, the identification codes of both the eyes is produced. Referring to FIG. 5E, there is shown identification codes 17, 18 of both eyes.

A security level of the iris identification apparatus decides the total number of the ringed areas. Namely, although the security level is raised by increasing the number of the ringed areas, it takes the apparatus some time to produce the identification code.

Further, although the identification code is produced from both eyes, the iris can compare by using either identification code.

Figure 6:
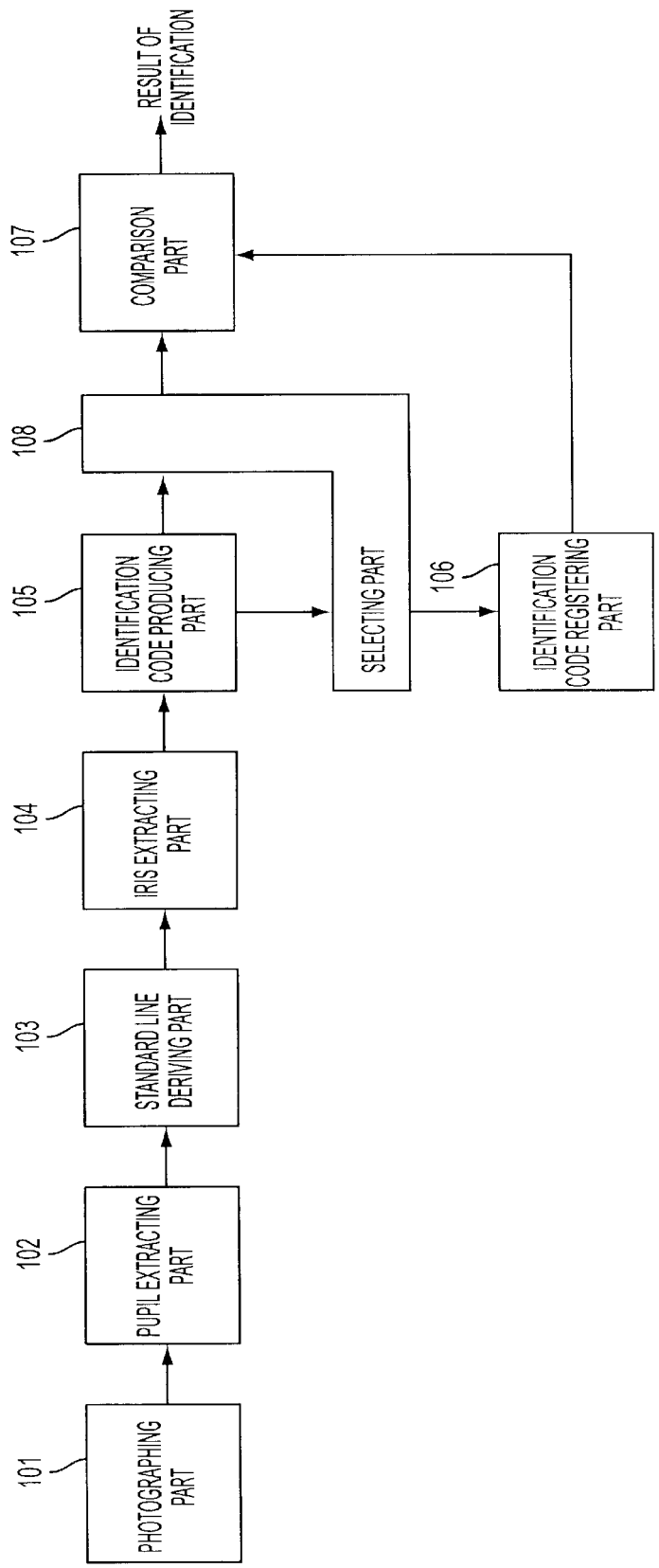
FIG. 6 is a block diagram, which adds a selector to FIG. 1.

Referring to FIG. 6, there is shown a block diagram of the apparatus that has a selecting part 108 for selecting one identification code. The selecting part 108 selects the identification code of the right eye 17 or the identification code of the left eye 18 and transmits the selected code to the identification code registering part 106 and the comparison part 107.

Further, the selecting part 108 selects the identification code for sending in accordance with the predetermined command of the apparatus or the operation of the person to be identified. A select process of the selecting part 108 is executed on step A and step B in FIG. 2.

When the apparatus selects the identification code, the identification code 17 is selected by the selecting part 108 and is registered at the identification code registering part 106 if the right eye is set up in advance in order to identify an iris in the apparatus (Step A in FIG. 2). In Step B (FIG. 2), the comparison part 107 compares the identification code of the right eye with the identification code registered in Step A. If the left eye is set up in the apparatus, the above processes are executed by the identification code of the left eye.

In the case that the person 1 selects the identification code of the left or right eye, the apparatus provides an input unit (not shown) for selecting the identification code of the left or right eye.

The person 1 operates the input unit at each process of registration (Step A in FIG. 2) and comparison (step B in FIG. 2) and specifies the right or left eye, which the person wants to identify.

The process of iris identification (step S30) is executed after the identification code is produced at Step 20 in FIG. 2. The process of iris identification (step S30) is classified into two types in accordance with objectives that are a registering process and a comparing process.

At first the process for registering the new iris pattern of the person 1 is explained. If the instruction for registering of the new iris pattern is set up by the person 1 in advance, the process transfers to step S32 from step S31. And the identification code registering part 106 stores the identification code taken by the process at step S20 into a storage device (not shown). After the new iris pattern is registered, the apparatus notifies the person 1 of its completion by blinking or turning off the lights.

Next, the process for comparing an iris pattern of the person 1 with the registered iris pattern is explained. If the instruction for comparing an iris pattern is set up by the person 1 in advance, the process transfers to step S33 from step S31. In step S33, the comparison part 107 reads the identification code stored in the storage device (not shown). Further, the identification code is stored in the storage device in connection with a secret number.

The new identification code produced for executing the individual recognition is compared with the originally identification code registered at step S32 (step S34). If both the codes agree at the step S35, it is confirmed that the person 1 to be identified is a person who has registered an iris pattern in the past (step S36). In this case, the apparatus notifies the person 1 of the completion of the individual recognition.

Further, if both the codes do not agree at the step S35, it is confirmed that the person to be identified is a person who has not registered an iris pattern in the past. In this case, the apparatus notifies the person 1 of the failure of the individual recognition by turning on the lights and/or displaying a message.

According to the first embodiment, between the new identification code and the registered identification code can be compared regardless of the slant of the face of a person to be identified because the identification code produced under the standard line does not influence the slant of the face of the person. In addition, the identification code produced from the iris pattern is possible to standardize.

Because each pattern of the identification code corresponds to each rectangular area of the iris area, the comparison of the identification code is always accurate even though the pupil expands and contracts.

Further, since the person to be identified only enters the person's own eyes in the scope of the photographing, the optical axis of the eye is easy to correspond to the optical axis of the camera. In addition, the person 1 can confirm the photographing condition by seeing the eyes appeared on the visible light cutting glass because both eyes is photographed.

Moreover, the iris pattern is acquired with large quantities and high speed by photographing both eyes. Thus, the apparatus can take high precision in the security.

In present embodiment, because the apparatus also can calculate the position of both eyes, the position of both eyes can use as data for identifying. Therefore, the reliability of individual identification can be improved furthermore.

Next, a second embodiment is explained as follows.

A feature of this embodiment is that the identification codes 17 and 18 of both eyes produced by steps explained in FIG. 5 through FIG. 3 is synthesized.

Figure 7A:
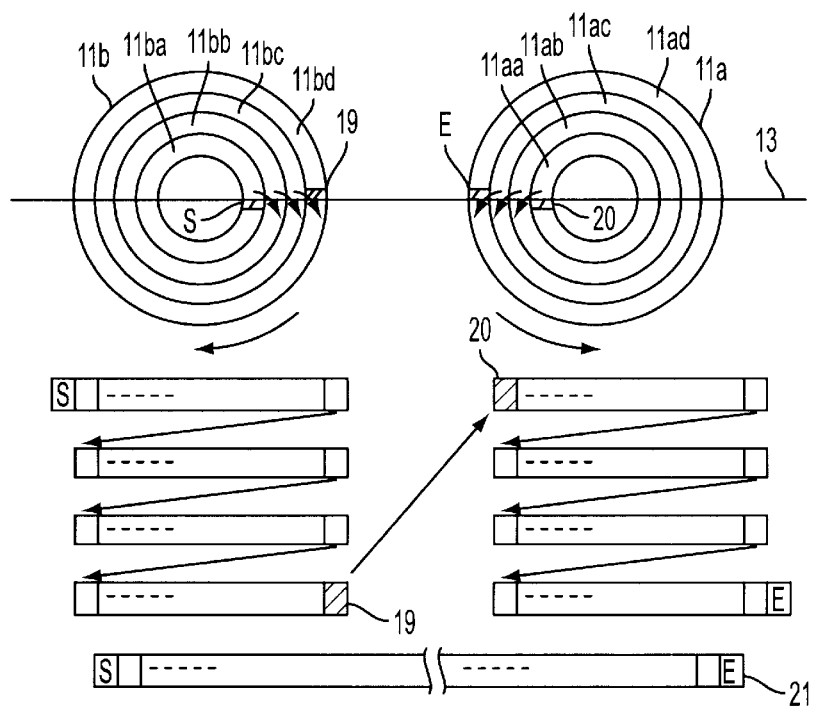
FIGS. 7A and 7B show a process for composing identification code in the second embodiment of the present invention.
Figure 7B:
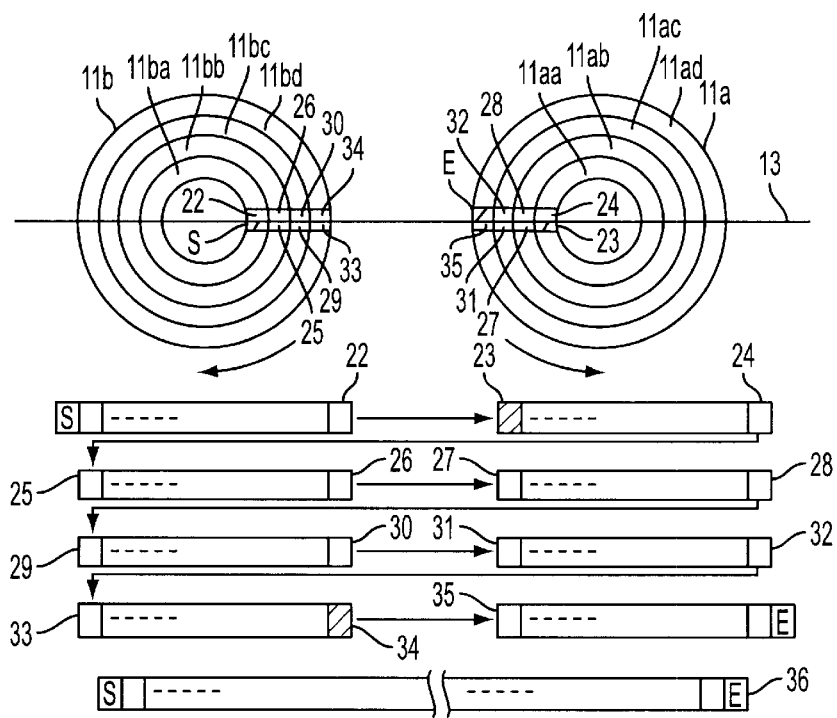

Referring to FIGS. 7A and 7B, there is explained about synthesizing the identification codes.

In FIG. 7A, it is shown that two identification codes produced by both eyes are changed to one code by connecting them in series. That is, an ending code 19 in the identification code 17 of the right eye and a starting code 20 in the identification code 18 of the left eye are deleted. And the identification code 18 is coupled to the rear of the identification code 17 in series, and a synthesized identification code 21 is produced.

Referring to FIG. 7B, another way for synthesizing identification codes is shown.

A first identification code S through an ending identification code 22 is produced in a first ringed area 11ba of the right eye. Next, a first identification code 23 through an ending identification code 24 is produced in a first ringed area 11aa of the left eye. And the first identification code 23 is coupled to the rear of the ending identification code 22 in series. Under the above mentioned way, identification codes are produced in each ringed area 11bb, 11ab, 11bc, 11ac, 11bd and 11ad and each first identification code 25, 27, 29, 31, 33 and 35 of the left eye is coupled to the rear of each ending identification code 24, 26, 28, 30, 32 and 34 in series. Finally, a synthesized identification code 36 is produced.

In this second embodiment, it is very difficult to forge data for identifying an individual since identification codes of both eyes is synthesized.

Next, a third embodiment is explained. Individual identification using an iris pattern is executed with high reliability. However, the individual identification may fail due to the opening extent of eyes or the use of false eyelashes. That is, new identification code that is prepared differs from the identification code that has registered in advance.

Therefore, the individual identification that does not influence due to the opening extent of eyes or the use of false eyelashes is realized in the third embodiment.

Figure 8:
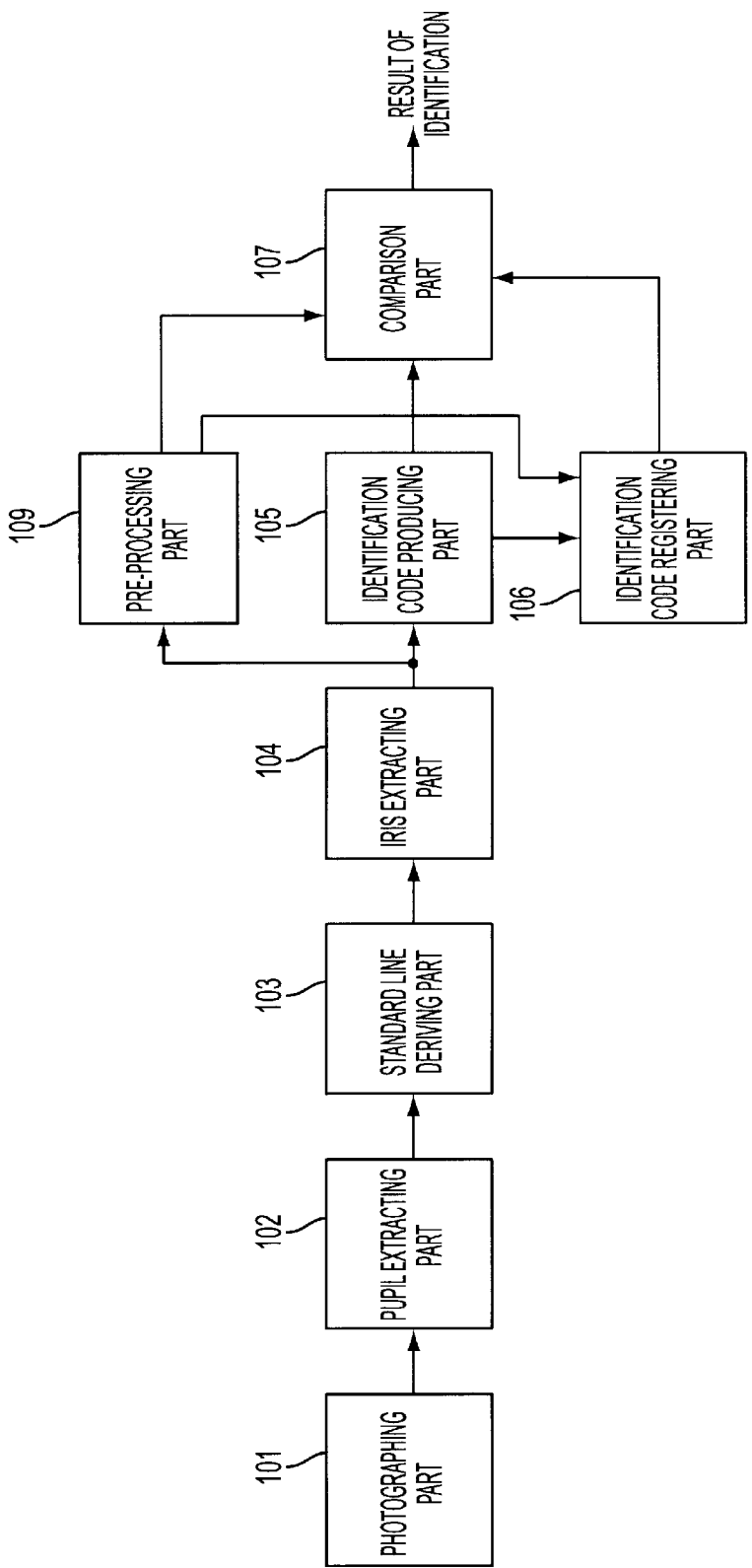
FIG. 8 is a block diagram of an iris identification apparatus of the third embodiment of the present invention.

Referring to FIGS. 8, 9 and 10, there is shown an iris identification apparatus in the third embodiment. The explanation of a photographing part 101, a pupil extracting part 102, a standard line deriving part 103, an iris extracting part 104, an identification code producing part 105 and an identification code registering part 106 is omitted because it is already explained in the first embodiment. A pre-processing part 109 calculates two assisting standard lines lying at right angle to a standard line and passing through central coordinates of each pupil. And the pre-processing part 109 calculates coordinates of each point crossing the feature of a living body to the assisting standard line and calculates a boundary standard line having the same slant as the standard line and passing the coordinates of each point. Further, the pre-processing part 109 sets up a part of a iris surrounded by a dividing line between the iris and pupil, a dividing line between the white of eye and the iris, and the boundary standard line as an iris core area.

Figure 9A:
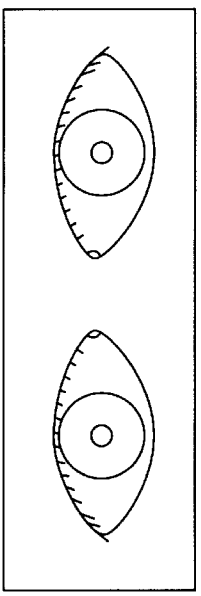
FIGS. 9A, 9B, 9C, 9D, 9E, 9F, 9G, 9H, 10A, 10B and 10C show a step for extracting an iris core field in the third embodiment.
Figure 9B:
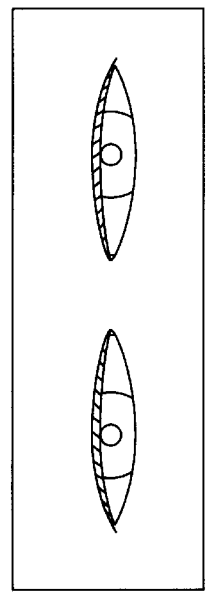

Next, an action is explained in the third embodiment. FIGS. 9A and 9E are image data of a person to be identified in the registration. FIG. 9B is image data of narrow eyes and FIG. 9F is image data of the person with false eyelashes 38.

FIGS. 9C, 9D, 9G and 9H are results that have calculated iris areas from image data.

Figure 9C:
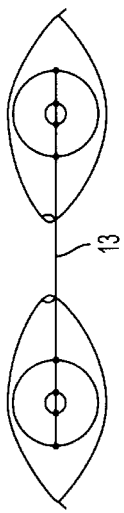
Figure 9D:
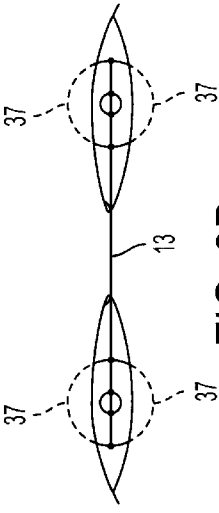
Figure 9E:
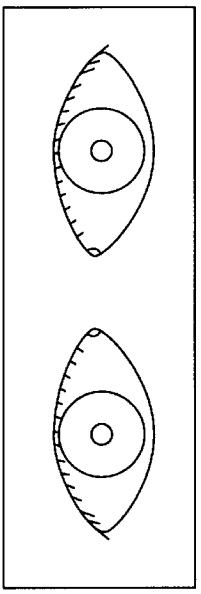
Figure 9F:
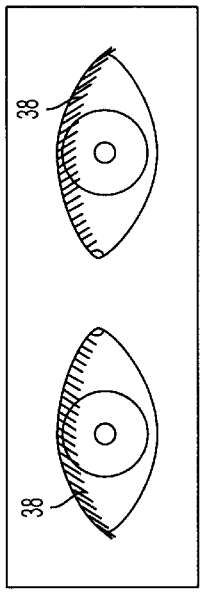
Figure 9G:
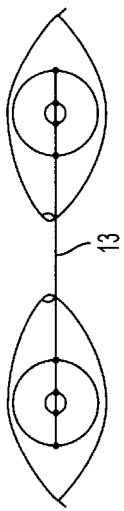

In FIG. 9C, an iris pattern is extracted precisely because an iris area is calculated under the condition of eyes shown in FIG. 9A. However, because a luminance distribution on the standard line 13 in FIG. 9B agrees with the condition in FIG. 9A, an iris area calculated in FIG. 9B is the same result as an iris area shown in FIG. 9C. Therefore, a comparison of an identification code is failure since vertical sides of an area 37 shown in FIG. 9D is cut off by an upper eyelid.

Figure 9H:
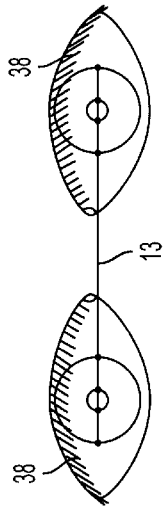

In FIG. 9H, an iris area also is cut off an upper side by the false eyelashes 38.

Figure 10A:
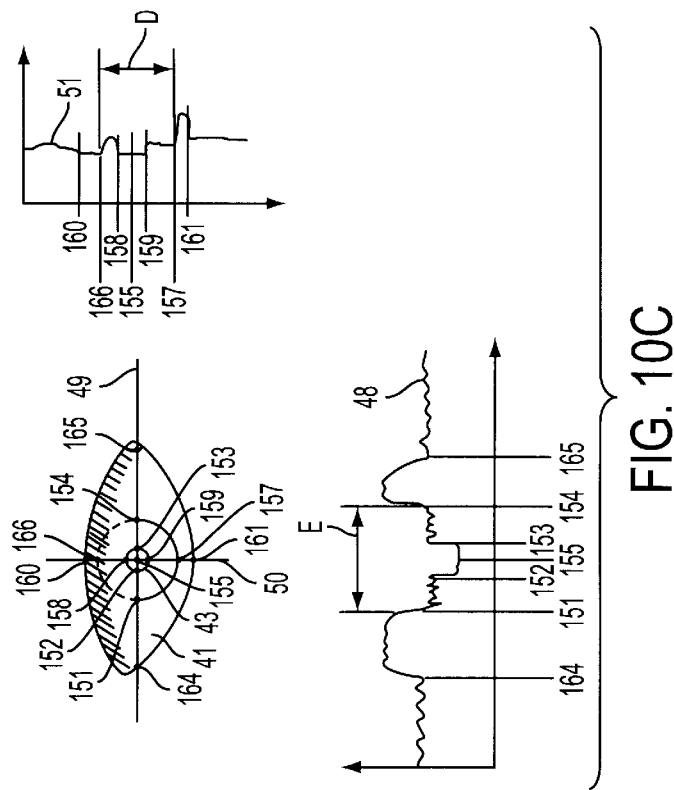
Figure 10B:
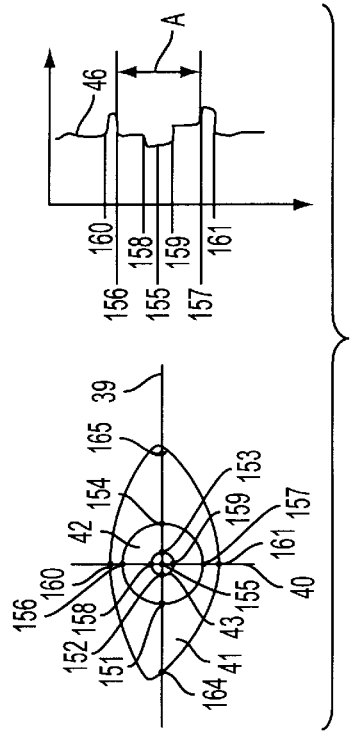
Figure 10C:
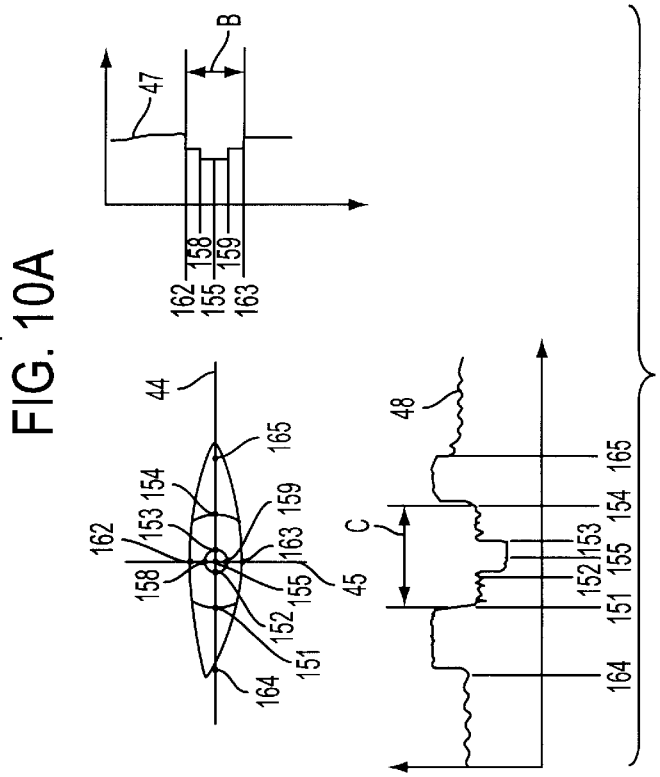

Referring to FIGS. 10A and 10C, a result that measures a luminance distribution along standard lines 39 and 44 and assisting standard lines 40 and 45 is shown. In FIGS. 10A and 10B, a white eye 41, an iris 42, a pupil 43, a luminance curve 46 and 47 on an assisting standard line 40 and 45 and a luminance curve 48 on assisting standard lines 39 and 44 is shown. Coordinates 151–165 are points crossing the standard lines 39 and 44 or the assisting standard lines 40 and 45 and the living body feature of eyes, for example, an iris, a pupil, eyelashes, an eyelid.

A radius of the pupil is calculated by extracting the scope that is the lowest value of the luminance on the curve 48. The distance between the coordinate 152 and the coordinate 155 is compared with the distance between the coordinate 153 and the coordinate 155. As the result, the bigger radius is selected as the radius of the pupil. Further, the coordinate 155 is center coordinates of the pupil.

Next, the radius of the iris is calculated. In accordance with reflection characteristics of the eye, the white of eye is the brightest and the pupil is the darkest. Therefore, The distance between the coordinate 151 and the coordinate 155 is compared with the distance between the coordinate 154 and the coordinate 155, and the smaller radius is selected as the radius of the iris.

Finally, a dividing point is calculated. The dividing point is the point for deleting a part hidden by an upper eyelid from an iris area. Further, the iris area is calculated by the radiuses of the pupil and iris.

In the curve 48, the distance between the coordinate 151 and the coordinate 155, and the distance between the coordinate 154 and the coordinate 155, and the luminance value of the coordinates 151, 152, 153 and 154 is set up as standard value. Then, the luminance value in the curve 47 is compared with the standard value and analyzed. As the result, the coordinates 158, 162, 159 and 163 is extracted but the coordinates 162 and 163 are set up as the dividing points for limiting the iris area.

Therefore, the distance between the coordinate 155 and the coordinate 162 is calculated, and the distance between the coordinate 155 and the coordinate 163 is calculated. And a scope B shown in the curve 47 is extracted. The scope B does not influence the production of the identification code even though an eyelid closes the part of the iris.

In this case that the person wears the false eyelashes 38, a scope D that does not influence the production of the identification code is calculated by the same way as the mentioned above (FIG. 10C). Further, the coordinates 157 and 166 are the dividing points for limiting the iris area.

Figure 11:
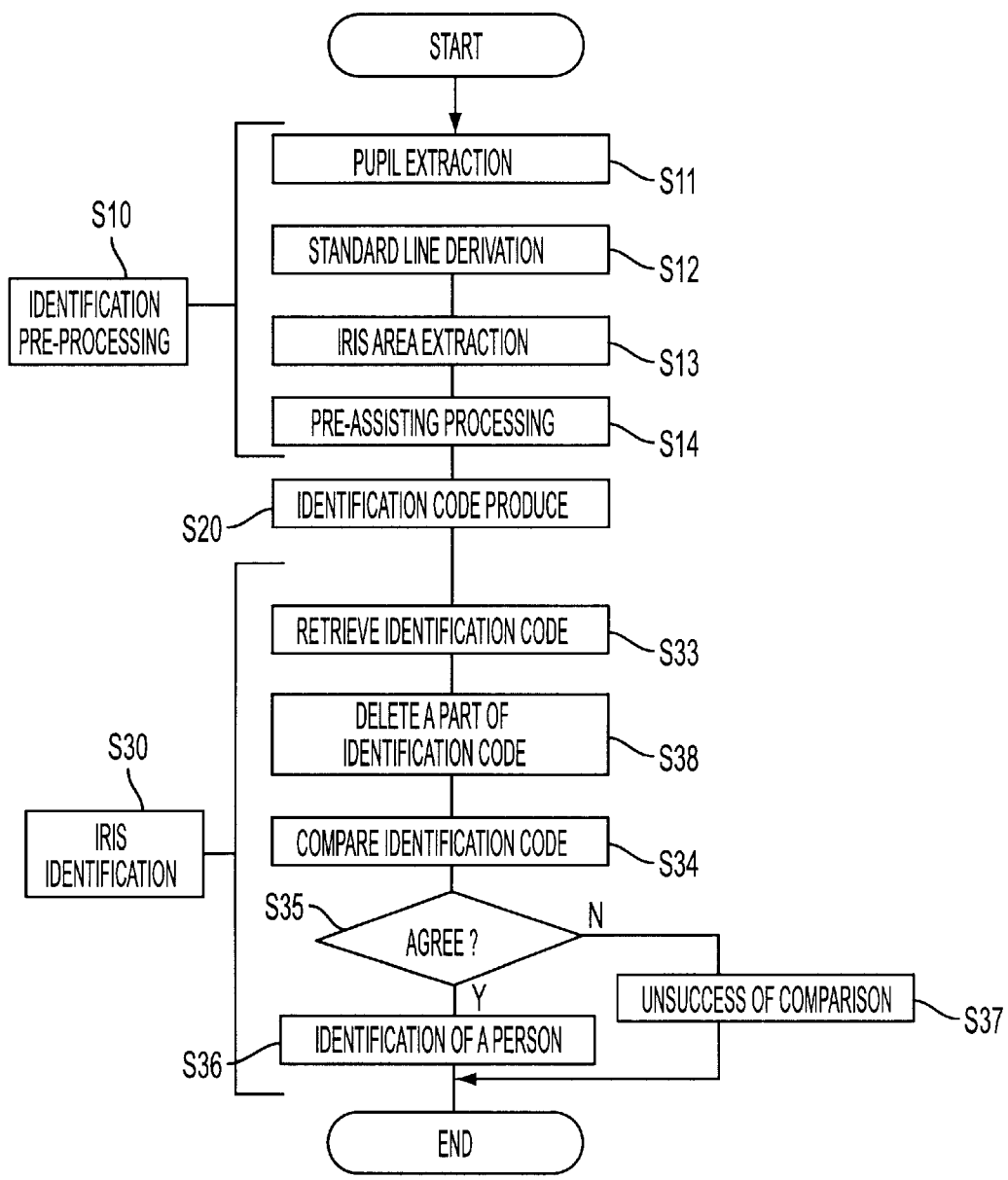
FIG. 11 is a flow diagram showing comparison processes of the third embodiment.

Referring to FIGS. 11, 12A and 12B, the processes for identifying the person is explained in the third embodiment.

In FIG. 11, each step of a pupil extraction (step S11), a standard line derivation (step S12) and an iris area extraction (step S13) are the same process as the first embodiment in FIG. 2. A process in step S14 is executed by the pre-processing part 109 and is explained in detail in FIGS. 12A and 12B. An iris core area acquired by the analysis in FIG. 10B is shown in FIG. 12A and an iris core area acquired by the analysis in FIG. 10C is shown in FIG. 12B.

A standard line 53 and 60, an iris cores area 54 and 62, a dividing circle 55 and 63, a dividing line 56, 57 and 61 and a deleting area 58, 59 and 64 are shown in FIG. 12A and 12B. The distance between the coordinate 162 and the center 155 is compared with the distance between the dividing 163 and the center 155 (shown in FIG. 10B), and the dividing circle 55 is calculated under the smaller distance. The distance between the coordinate 162 and the center 155 is compared with the distance between the coordinate 157 and the center 155 (shown in FIG. 10C), and the dividing circle 63 is calculated under the smaller distance. The dividing line 56, 57 and 61 contacts with the dividing circle 55 and 63 and is parallel with the standard line 53 and 60.

The iris core area 54 and 62 is calculated at step S14, and the identification code is produced by the iris core area 54 and 62 at step S20.

Next, an iris identifying process is explained at step S30. The comparison part 107 retrieves the identification iris code in the iris area registered in the storage device (not shown) in advance (step S33).

The comparison part 107 deletes the identification code of the deleting area 58, 59 and 64 from the identification code retrieved at step S33 (step S38), and compares it with the identification code for executing the individual identification (step S34). The identification code registered can keep the correspondence relation with the identification code for executing the individual identification even though the deleting area (58, 59 and 64) is deleted, since the identification code registered is the same standard point as the identification code for executing the individual identification.

The explanation of processes after step S35 is omitted because it is already explained in the first embodiment.

The third embodiment also can be applied to the registration of the identification code of a person to be identified.

In this case, the identification code registering part 106 registers the identification iris code of the iris core area 54 and 62 in FIGS. 12A and 12B. Therefore, because the degree of the change is less, the precision of the comparison can be kept even though the photographing condition changes.

As mentioned above, the comparing process is executed correctly without the influence of the eyelid and the false eyelashes.

The identification code registered can keep the correspondence relation with the identification code for executing the individual identification even though a part of the identification code is deleted, since the identification code registered is the same standard point as the identification code for executing the individual identification.

Next, a fourth embodiment is explained as the following.

Figure 13:
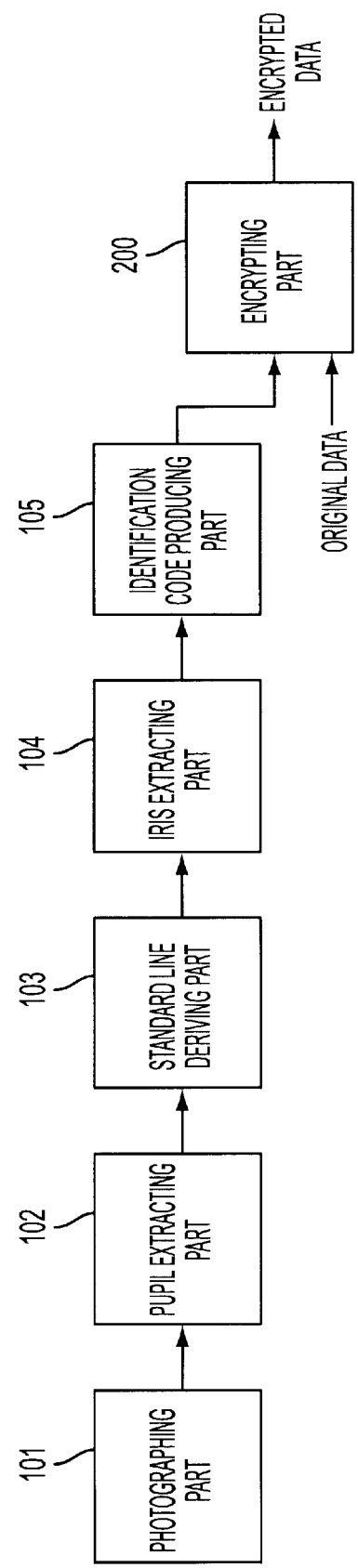
FIG. 13 is a block diagram of a data converter of the third embodiment of the present invention.

Referring to FIG. 13, an encrypting part 200 encrypts an original data with the predetermined function by using an identification code produced by the identification code producing part 105. The identification code is used as key for deciphering encrypted data. Further, the explanation of the other elements 101, 102, 103, 104 and 105 is omitted because it is already explained in the first embodiment.

Figure 14:
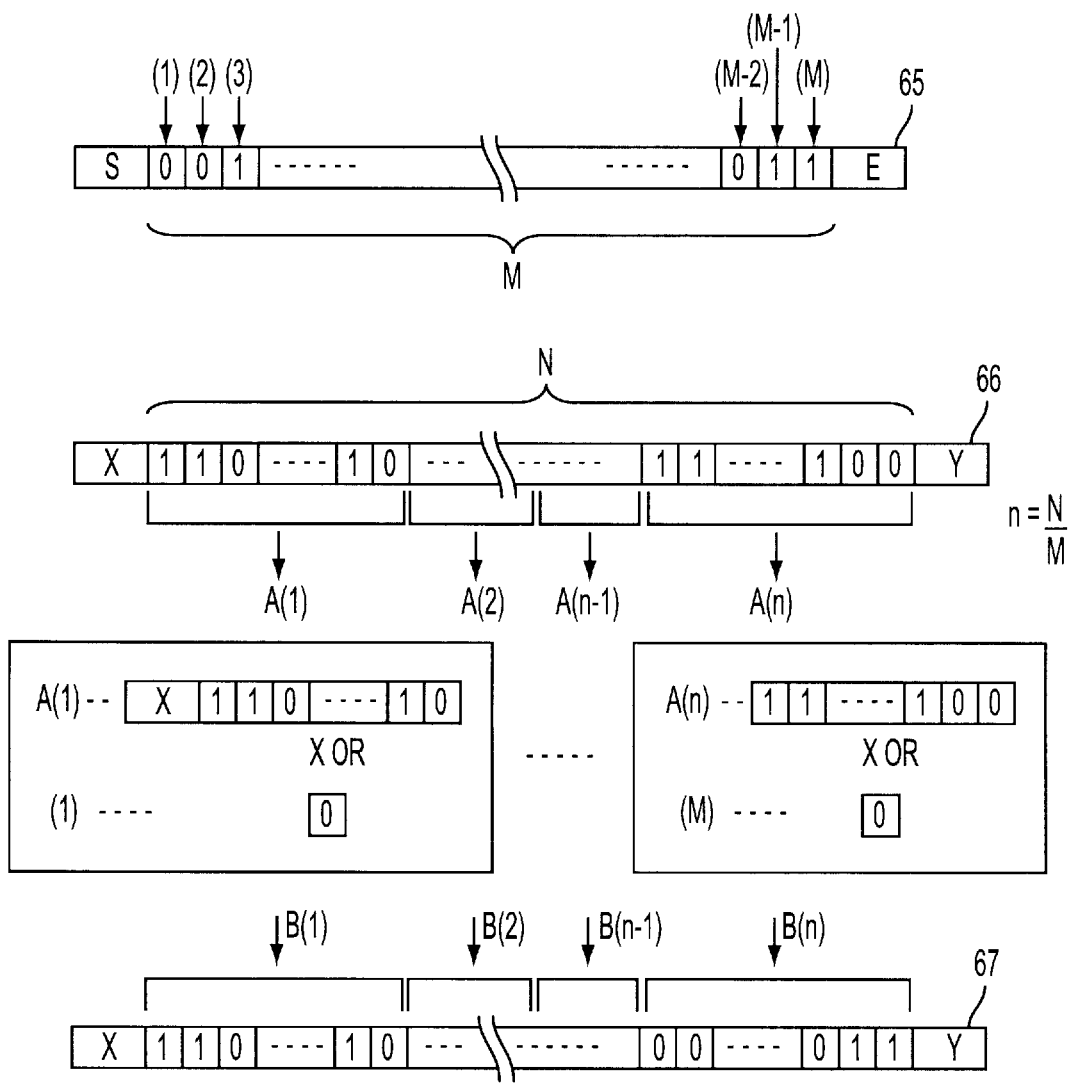
FIG. 14 shows a process for converting data by the data converter shown in FIG. 13.

Referring to FIG. 14, identification code 65, original data 66 and encrypted data 67 are shown. The identification code 65 of the iris pattern is used as a key for encrypting the original data 66.

The identification code 65 is divided into M bits. If the original data consists of N bits, the original data is divided into n blocks that consist of several bits. Further, the variable n equals to the variable N divided by the variable M. That is, the amount of the bits of the identification code equals the amount of the blocks of the original data.

The encrypting part 200 makes to correspond each bits in the identification code to each blocks of the original data, and changes the bits composing the blocks in the original data 66 by using each bits of the identification code 65. And each bits of a block A(1) and the bit (1) of the identification code 65 is calculated by predetermined function that is called the exclusive OR. In this way, the block A(1) is changed to the block B(1) by the encryption. When all of the block of the original data 66 are calculated, the original data 66 changes to encrypted data 67. Further, the identification code 65 is used as key for deciphering when the encrypted data 67 is deciphered. Then, steps for computing becomes the reverse of the steps of the encryption as mentioned above, and the function that is used in order to calculate is the exclusive-OR.

Thus, because identification code of an iris pattern is used as key for encrypting, it is easy to handle a key and the safety is heightened.

As many apparently widely different embodiments of this invention may be made without departing from the spirit and scope thereof, it is to be understood that the invention is not limited to the specific embodiments thereof except as defined in the appended claims.

What is claimed is:

1. A method for identifying an iris, comprising the steps of:

acquiring a part of a face including an image of both eyes;

calculating a standard line passing through centers of both eyes;

extracting an iris area on the standard line by luminance distribution;

dividing the iris area into a plurality of pieces;

calculating a luminance for each piece; and coding the luminance distribution of the plurality of the pieces on the basis of a starting pattern on the standard line.

2. A method according to claim 1, wherein each piece is acquired by dividing the iris area based on circumference and radius.

3. A method according to claim 1, wherein two codes that are coded for the iris areas of both eyes are synthesized.

4. A method according to claim 1, further comprising the steps of calculating several points dividing an iris from a part other than the iris by the luminance distribution on two assisting standard lines lying at right angles to the standard line and passing through the center of each pupil, calculating at least one boundary standard line having a same slant as the standard line and passing through coordinates of at least one point, and extracting an iris core area based on a part of the iris surrounded by a dividing line between the iris and the pupil, a dividing line between a white of the eye and the iris, and the boundary standard line.

5. An apparatus for identifying an iris, comprising:

a photographing part for photographing an area including both eyes;

a standard line deriving part for calculating a standard line passing through centers of both eyes;

an iris extracting part for extracting an iris area on the standard line by luminance distribution;

a code producing part for dividing the iris area into a plurality of pieces, calculating a luminance for each piece and coding the luminance distribution of the plurality of the pieces on the basis of a starting pattern on the standard line;

a code registering part for registering a first identification code produced by the code producing part; and a comparison part for comparing a second identification code produced by the code producing part with the first identification code registered by the code registering part.

6. An apparatus according to claim 5, wherein the code producing part divides the iris area based on circumference and radius.

7. An apparatus according to claim 5, wherein the code producing part synthesizes two codes that are coded for the iris areas of both eyes.

8. An apparatus according to claim 5, further comprising a pre-processing part calculating several points dividing an iris from a part other than the iris by the luminance distribution on two assisting standard lines lying at right angles to the standard line and passing through the center of each pupil, calculating at least one boundary standard line having a same slant as the standard line and passing through coordinates of at least one point, and extracting an iris core area based on a part of the iris surrounded by a dividing line between the iris and the pupil, a dividing line between a white of the eye and the iris, and the boundary standard line.

9. An apparatus according to claim 5, wherein the photographing part further comprises a lighting unit irradiating infrared light toward both eyes.

10. An apparatus for changing data, comprising:

a photographing part for photographing an area including both eyes;

a standard line deriving part for calculating a standard line passing through centers of both eyes;

an iris extracting part for extracting an iris area on the standard line by luminance distribution;

a code producing part for dividing the iris area into a plurality of pieces, calculating a luminance for each piece and coding the luminance distribution of the plurality of the pieces on the basis of a starting pattern on the standard line to obtain a code; and a changing part for changing the data by using the code produced by the code producing part in accordance with a predetermined function.

11. A method according to claim 1, wherein the luminance distribution of the plurality of the pieces is coded on the basis of the starting pattern and an ending pattern on the standard line.

12. An apparatus according to claim 5, wherein the luminance distribution of the plurality of the pieces is coded on the basis of the starting pattern and an ending pattern on the standard line.

13. An apparatus according to claim 10, wherein the luminance distribution of the plurality of the pieces is coded on the basis of the starting pattern and an ending pattern on the standard line.

* * * * *